US008600175B2

(12) United States Patent
Ishiguro

(10) Patent No.: US 8,600,175 B2
(45) Date of Patent: Dec. 3, 2013

(54) APPARATUS AND METHOD OF PROCESSING IMAGE INCLUDING CHARACTER STRING

(75) Inventor: Taisuke Ishiguro, Kamagaya (JP)

(73) Assignee: Canon Kabushiki Kaisha, Tokyo (JP)

( * ) Notice: Subject to any disclaimer, the term of this patent is extended or adjusted under 35 U.S.C. 154(b) by 326 days.

(21) Appl. No.: 12/907,336

(22) Filed: Oct. 19, 2010

(65) Prior Publication Data

US 2011/0097002 A1 Apr. 28, 2011

(30) Foreign Application Priority Data

Oct. 23, 2009 (JP) ................... 2009-244728

(51) Int. Cl.
*G06K 9/72* (2006.01)
*G06K 7/10* (2006.01)
*G06K 9/18* (2006.01)

(52) U.S. Cl.
USPC ............................. 382/229; 382/321; 382/185

(58) Field of Classification Search
USPC ......................... 382/185, 229, 321
See application file for complete search history.

(56) References Cited

U.S. PATENT DOCUMENTS

| 5,555,362 A * | 9/1996 | Yamashita et al. ............ 715/209 |
| 6,466,954 B1 * | 10/2002 | Kurosawa et al. ............ 715/209 |
| 6,539,116 B2 * | 3/2003 | Takaoka ........................ 382/229 |
| 6,885,768 B2 * | 4/2005 | Fujiwara ....................... 382/181 |
| 7,203,364 B2 * | 4/2007 | Yamazaki ..................... 382/177 |
| 7,567,730 B2 * | 7/2009 | Ohguro ......................... 382/290 |
| 7,865,353 B2 * | 1/2011 | Koyama et al. .................. 704/3 |
| 8,270,718 B2 * | 9/2012 | Drory et al. ................... 382/181 |
| 2002/0031270 A1 * | 3/2002 | Yamazaki ..................... 382/229 |
| 2007/0019248 A1 * | 1/2007 | Ho et al. ....................... 358/462 |

FOREIGN PATENT DOCUMENTS

JP 4188288 7/1992

* cited by examiner

*Primary Examiner* — Utpal Shah
(74) *Attorney, Agent, or Firm* — Fitzpatrick, Cella, Harper & Scinto

(57) ABSTRACT

Image processing apparatus and method perform a character recognition process to an area indicating a character string included in image data, generate layout information for layout of the character string on the basis of the area, and perform layout of a result of the character recognition process on the basis of the generated layout information, thereby enabling to perform a process, which uses the layout information, to a document which includes various layouts.

8 Claims, 13 Drawing Sheets

FIG. 2A
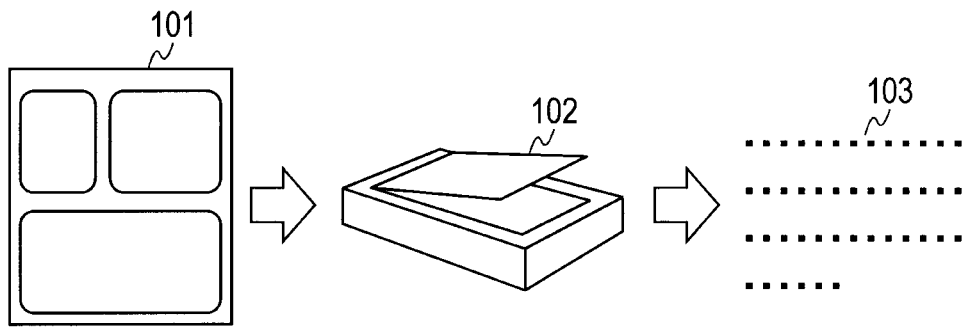
FIG. 2B
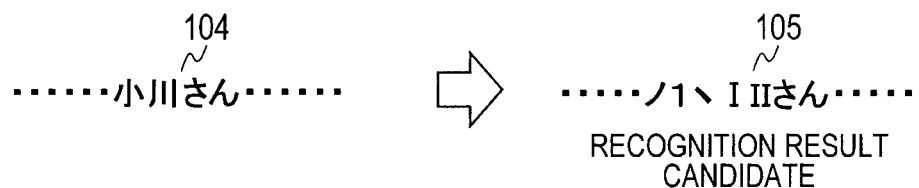
RECOGNITION RESULT
CANDIDATE
FIG. 2C
・・・・・・小川さん・・・・・・
FINAL
RECOGNITION RESULT

| DATA ID | ATTRIBUTE | COORDINATE X | COORDINATE Y | WIDTH W | HEIGHT H |
|---|---|---|---|---|---|
| 1 | 1 | X1 | Y1 | W1 | H1 |
| 2 | 3 | X2 | Y2 | W2 | H2 |
| 3 | 2 | X3 | Y3 | W3 | H3 |
| 4 | 1 | X4 | Y4 | W4 | H4 |
| 5 | 2 | X5 | Y5 | W5 | H5 |

FIG. 8

| PATH ID | FIRST CANDIDATE CHARACTER || SECOND CANDIDATE CHARACTER || ... | n-TH CANDIDATE CHARACTER ||
|---|---|---|---|---|---|---|---|
|  | CHARACTER CODE | RECOGNITION SCORE | CHARACTER CODE | RECOGNITION SCORE | ... | CHARACTER CODE | RECOGNITION SCORE |
| 1 | ノ | 9000 | ... | ... | ... | ... | ... |
| 1 | 1 | 8700 | ... | ... | ... | ... | ... |
| 1 | ノ | 9200 | ... | ... | ... | ... | ... |
| 1 | エ | 7600 | ... | ... | ... | ... | ... |
| 1 | エ | 8000 | ... | ... | ... | ... | ... |
| 1 | エ | 8000 | ... | ... | ... | ... | ... |
| 2 | セ | 9600 | ... | ... | ... | ... | ... |
| 2 | ん | 9800 | ... | ... | ... | ... | ... |
| 2 | リ | 8700 | ... | ... | ... | ... | ... |
| 2 | ノ | 9200 | ... | ... | ... | ... | ... |
| ... | ... | ... | ... | ... | ... | ... | ... |

701 / 702 / 703 / 704

| CHARACTER CODE | RECOGNITION SCORE | COEFFICIENT BASED ON FONT SIZE | CORRECTED SCORE |
|---|---|---|---|
| 不 | 7800 | 10 | 78000 |
| 采 | 7750 | 10 | 77500 |
| 才 | 6530 | 10 | 65300 |
| ノ | 5020 | 68 | 341360 |
| 木 | 3050 | 12 | 36600 |
| t | 2005 | 75 | 153750 |
| X | 1800 | 50 | 90000 |

1001  1002  1003  1004

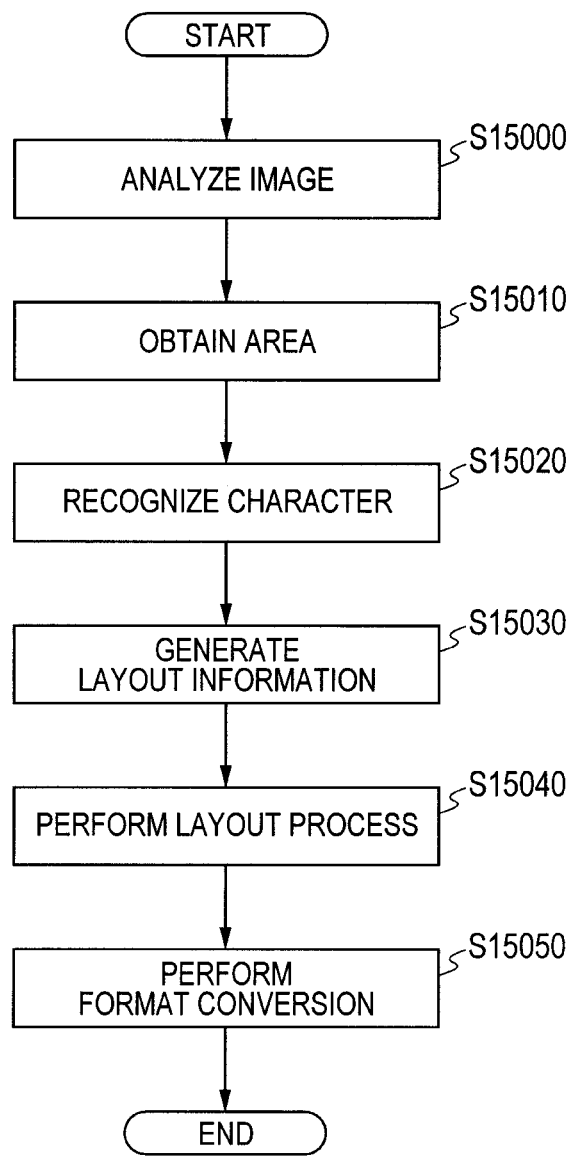

APPARATUS AND METHOD OF PROCESSING IMAGE INCLUDING CHARACTER STRING

BACKGROUND OF THE INVENTION

1. Field of the Invention

The present invention relates to an apparatus which processes an image including a character string, and a method which is used by the relevant apparatus.

2. Description of the Related Art

There has been known a technique of reusing data described on a paper document by scanning the document, generating a document image from the scanned document, and then performing various processes to the generated document image. For example, there has been known a technique of performing a character recognition process to the document image. On the other hand, there is information which is lost in the document when the document image is generated from the document. For example, there is a possibility that font information, font size information, character stuffing information and the like which act as character layout information in the document are lost when the document image is generated from the document. Under the circumstances, it is conceivable that it is possible to make the process for the document image more efficient if such lost information can be used again. For this reason, there has been known a technique of trying to solve such a problem by previously defining information which can be substituted for the lost information. For example, in Japanese Patent Application Laid-Open H04-188288, a character spacing (or a character pitch) is previously defined as a rule of a character layout, and then the defined character spacing is compared with a character spacing actually obtained as a result of character recognition, thereby improving recognition accuracy.

However, in such a technique as described above, judgment can be performed only based on the previously set rule. In other words, there is a problem that it is impossible in the above technique to perform correction to a document which has been created by using an unset rule. This problem occurs because the layout information of the document is unclear. That is, since the layout information is unclear in the related art, it takes action by previously storing or holding the layout information. However, in such a case, it is difficult to previously store or hold the layout information in regard to a document in which various layouts exist.

SUMMARY OF THE INVENTION

An object of the present invention enables to perform a process in which layout information is used, even in regard to documents which respectively have various layouts.

Consequently, the present invention is characterized by comprising: a character recognition unit adapted to perform a character recognition process to an area indicating a character string included in image data; a layout information generation unit adapted to generate layout information for layout of the character string on the basis of the area; and a layout unit adapted to perform layout of a result of the character recognition process by the character recognition unit, on the basis of the layout information generated by the layout information generation unit.

Further features and aspects of the present invention will become apparent from the following detailed description of exemplary embodiments with reference to the attached drawings.

BRIEF DESCRIPTION OF THE DRAWINGS

FIGS. 2A, 2B and 2C are conceptual diagrams for describing an operation of an overall recognition process.

FIG. 8 is a diagram for describing an example of a result of the character recognition process.

FIG. 16 is a flow chart indicating an example of an electronic format conversion process.

DESCRIPTION OF THE EMBODIMENTS

Preferred embodiments of the present invention will now be described in detail in accordance with the accompanying drawings.

Figure 1:
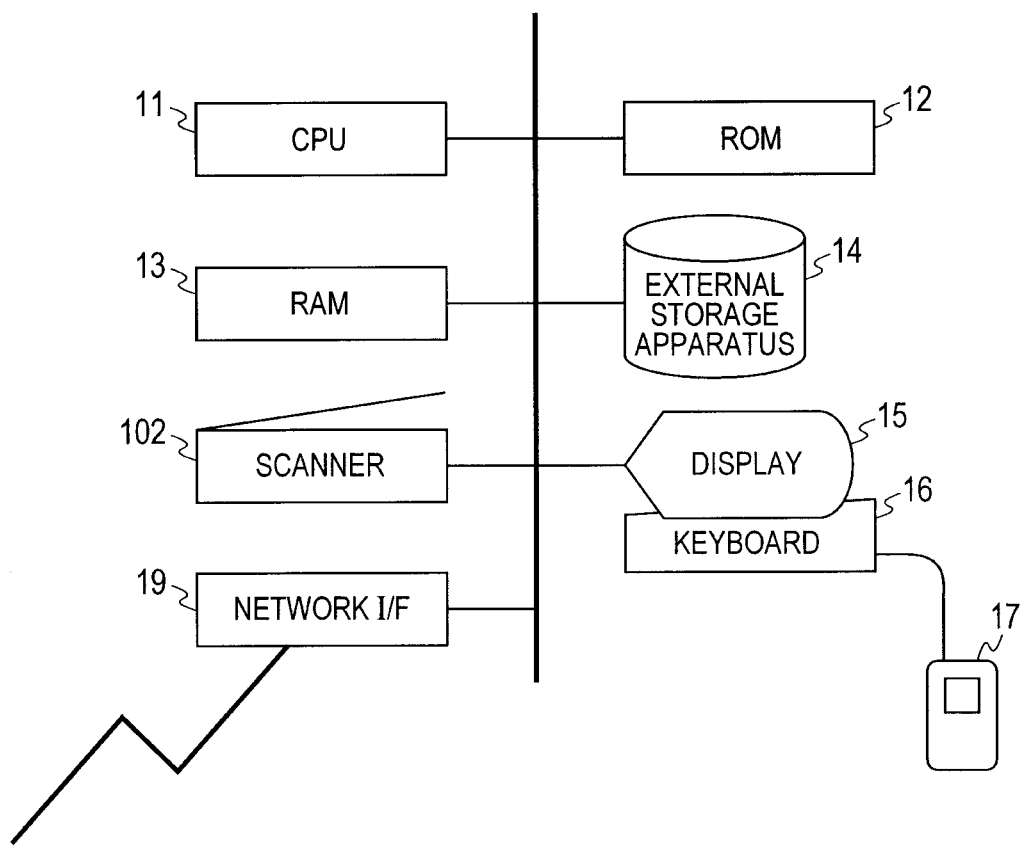
FIG. 1 is a block diagram illustrating an example of a hardware constitution of a character recognition processing apparatus which is an example of an image processing apparatus according to the present invention.

FIG. 1 is a block diagram illustrating an example of a hardware constitution of a character recognition processing apparatus which is an example of an image processing apparatus according to the present invention. In FIG. 1, a CPU (central processing unit) 11 controls the whole of the character recognition processing apparatus in accordance with a control program stored in a ROM (read only memory) 12. The ROM 12 stores therein the control program and the like, and a RAM (random access memory) 13 stores therein various image data and the like. An external storage apparatus 14 is an external memory such as a magnetic disk or the like. A display 15 displays, for example, a character recognition result and the like. A keyboard 16 is used to input various kinds of information in response to operator's handling. A pointing device 17 is, for example, a mouse or the like. A scanner 102 reads various images.

Incidentally, it should be noted that the character recognition processing apparatus can be attained even by a general-purpose computer. In this case, the control program provided through a medium or the like is once stored in the external storage apparatus 14. Then, the CPU 11 performs a process based on the stored control program, in response to an operator's instruction. Besides, a network I/F (interface) 19 communicates with an apparatus which is located at a not-illustrated distant place to read and write programs, data and the like from the relevant apparatus.

Incidentally, the scanner 102 and the display 15 may be connected through an interface.

If the CPU 11 performs the process based on the control program, various functions of the character recognition processing apparatus and processes according to later-described flow charts are achieved.

Subsequently, an outline of an embodiment 1 will be described. According to the present embodiment, in the character recognition processing apparatus, a typesetting result obtained by using the character recognition result and a state of an input document image are compared with each other, and thus the character recognition result is corrected based on a result of this comparison. Hereinafter, an outline of the process to be performed by the character recognition processing apparatus will be described with reference to FIGS. 2A, 2B and 2C.

That is, FIGS. 2A, 2B and 2C are the conceptual diagrams for describing an operation of the overall character recognition process. More specifically, FIG. 2A indicates the outline of the overall process. In the drawing, a document 101 which is a paper medium is input as a target of the recognition process. An input document which is input through the scanner 102 is treated as image data, and image analysis and character recognition processes are performed to the image data. A character code string 103 is output as a result of the character recognition.

FIG. 2B indicates an example of a character string 104 which is obtained by partially enlarging the input document, and an example of a recognition result candidate 105 for the character string 104. In the procedure of the character recognition process, plural recognition result candidates are generated for a certain character string. Then, the character recognition processing apparatus performs a correction process to the recognition result candidates, and thus outputs the final recognition result as character codes. The character recognition processing apparatus in the present embodiment performs not only the correction process conventionally used but also a comparison process of comparing a layout process result using the recognition result candidate with image data (indicating a character string) being the target of the recognition process. Then, the character recognition processing apparatus corrects the recognition result based on a result of the comparison process. Such a series of processes will be concretely described hereinafter with a simple example.

In an example illustrated in FIG. 2B, the recognition result candidate 105 of the character string 104 (in the image data) of "小川さん" includes "ノ", "1", "丶", "l", "l", "I", "さ" and "ん". If the character recognition processing apparatus performs the layout process by using the recognition result candidate, a result "ノ1丶IIIさん" is generated. Then, if the character recognition processing apparatus compares the generated result "ノ1丶IIIさん" with the character string "小川さん" being the target of the recognition process, it can be understood that each character position, the length of each character string, and the like are different. If the recognition result candidate is correct, the layout result which is obtained by using the recognition result candidate is sure to become equal with the states (i.e., the character position, the length of the character string, etc.) of the character string being the target of the recognition process. Consequently, if the layout result and the state of the recognition-target character string are different from each other, it can be said that the recognition result candidate is not correct. FIG. 2C indicates the result which is obtained by correcting the recognition result candidate by the above-described method. In the drawing, it can be understood that the target character string can be correctly recognized as "小川さん".

In the following, the detail of the present embodiment will be described with reference to FIGS. 3 to 14.

Figure 3:
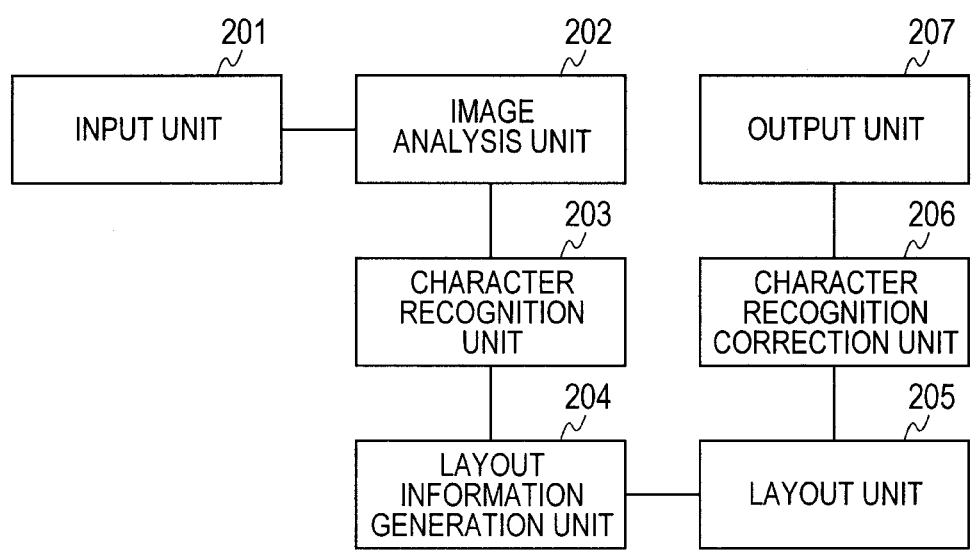
FIG. 3 is a block diagram illustrating an example of a functional constitution of the character recognition processing apparatus.

FIG. 3 is the block diagram illustrating an example of the functional constitution of the character recognition processing apparatus. In the drawing, an input unit 201 accepts user's instructions and inputs of paper-medium documents. The input paper-medium document is then converted into image data. An image analysis unit 202 analyzes the input image data, and thus extracts the components (character strings, photographs, figures, and the like) which constitute the document. A character recognition unit 203 performs the character recognition process to a character string area extracted by the image analysis unit 202. A layout information generation unit 204 extracts layout information in the character string area extracted by the image analysis unit 202. Here, it should be noted that the layout information includes a font, a size and the like of the character string. A layout unit 205 performs a layout process by using the layout information generated by the layout information generation unit 204 and the character (code) recognized by the character recognition unit 203. A character recognition correction unit 206 corrects the recognition result by comparing the character string extracted by the image analysis unit 202 with the layout result obtained by the layout unit 205. An output unit 207 displays the character recognition result, a user interface, and the like.

Figure 4:
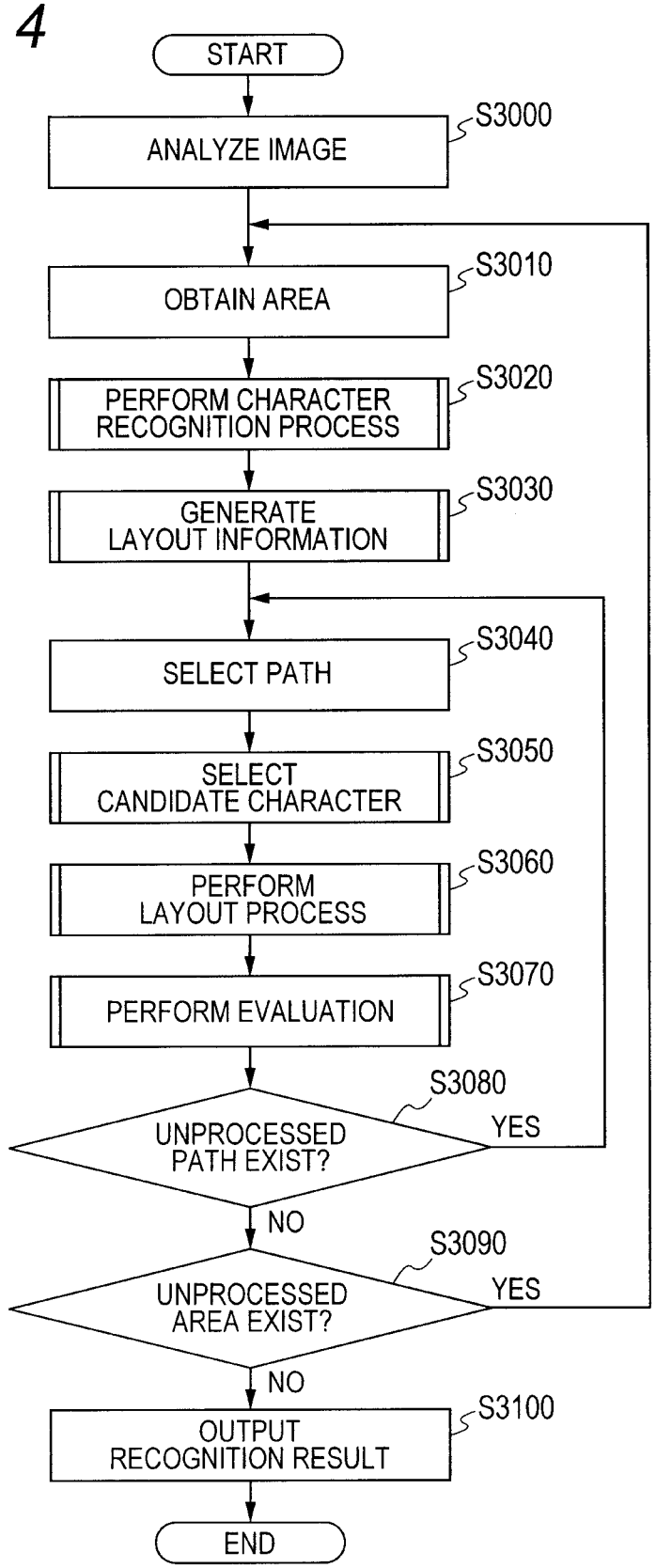
FIG. 4 is a flow chart indicating an example of the recognition process.

FIG. 4 is the flow chart indicating an example of the recognition process.

In a step S3000, the image analysis unit 202 performs a document image analyzing process. In the document image analyzing process, the image analysis unit 202 analyzes the document image generated in response to scanning inputs, and extracts the components (character strings, photographs, figures, and the like) which constitute the document. In any case, the document image analyzing process will be described later.

In a step S3010, the image analysis unit 202 obtains, among the components extracted in the step S3000, the area indicating the character string. In such an obtaining process, the image analysis unit 202 sequentially searches for the area having a smaller ID value in a document image analysis result (see later-described FIG. 6), and obtains a position and a circumscribed rectangle size of the area of which the component attribute is "1" (character string). The detail of the document image analysis result will be described later with reference to FIG. 6.

In a step S3020, the character recognition unit 203 performs the character recognition process to the area extracted in the step S3010. In the character recognition process, the character recognition unit 203 outputs paths indicating combination patterns of character cutout results, and character codes and scores in each path (see later-described FIG. 8). Although the detail of the character recognition process will be fundamentally described later, an outline of the character recognition process is briefly described here. That is, in the character recognition process, the character recognition unit 203 cuts out, from the character area in the image, the area that it seems to correspond to the character (character cutout process). Here, if the character cutout process is performed to the character string having an arbitrary length, there is a possibility that the plural paths are generated resultingly. More specifically, if the character "小" is cut out, there are two cases, that is, a case where it is cut out as "ﾘﾊﾞ" (path 1) and a case where it is cut out as "ﾉ", "1" and "ﾍ" (path 2). In general, if the character string becomes long, the patterns to be cut out become complicated, and also the number of the paths increases. In the present embodiment, the character recognition process is performed for each line. Thus, the plural paths are generated in regard to the character string for each line.

In a step S3030, the layout information generation unit 204 extracts the layout information based on the area extracted in the step S3010. Here, as described above, the layout information is the information such as the font, the size and the like of the character string which are necessary to lay out the character string. In any case, such a layout information generation process will be described later.

In a step S3040, the layout unit 205 selects, from the plural paths obtained in the step S3020, the path to which the layout process is performed. In such a path selection process, the layout unit 205 selects, from the paths to which a not-illustrated selected-flag is not given or added, the path of which the path ID is smallest, and then gives the selected-flag to the selected path. Here, the selected-flag is the flag which indicates that the selection has been completed.

In a step S3050, the layout unit 205 selects the candidate character in the path selected in the step S3040. In any case, such a candidate character selection process will later be described in detail with reference to FIG. 10.

In a step S3060, the layout unit 205 performs a layout process to the candidate character selected in the step S3050, by using the layout information obtained in the step S3030. In any case, the layout process will later be described in detail with reference to FIG. 12.

In a step S3070, the character recognition correction unit 206 calculates a score to the path by comparing the layout result obtained in the step S3060 with the character string, corresponding to the layout result, in the area obtained in the step S3010 and evaluating a result of the comparison. In any case, such an evaluation process will later be described in detail.

In a step S3080, the layout unit 205 judges whether or not the processes to all the paths obtained in the step S3020 end. In such a judgment step, the layout unit 205 first checks whether or not there is a path to which the selected-flag (not illustrated) is not given. If there is a path to which the selected-flag is not given, the layout unit 205 judges that a not-processed path exists, and returns the process to the step S3040. On the other hand, if there is no path to which the selected-flag is not given, the layout unit 205 judges that the processes to all the paths end, and then advances the process to a step S3090.

In the step S3090, the image analysis unit 202 judges whether or not the processes to, among the components obtained in the step S3000, all the areas respectively indicating the character strings end. The image analysis unit 202 deletes the information concerning the currently processed area from the document image analysis result. After the deletion, the image analysis unit 202 judges or checks whether or not the character string (of which the component attribute is "1") exists in the document image analysis result. If judged that the character string does not exist in the document image analysis result, then the image analysis unit 202 ends the process. On the other hand, if judged that the character string exists in the document image analysis result, then the image analysis unit 202 returns the process to the step S3010. Thus, it is possible by this process to perform the recognition process to the character strings in the input overall documents.

In a step S3100, the output 207 outputs, as the ultimate character recognition result, the character string of which the score to the path is highest. In the present embodiment, the output unit 207 outputs the character recognition result after the processes to all of the character string areas in the input document ended. However, the output unit 207 may output the recognition result for, e.g., each line.

Figure 5A:
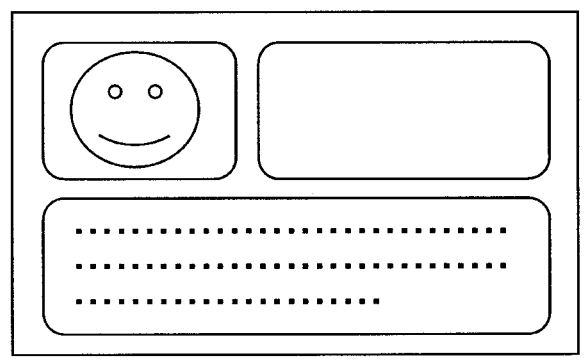
FIGS. 5A and 5B are conceptual diagrams for describing an example of a document image analyzing process.
Figure 5B:
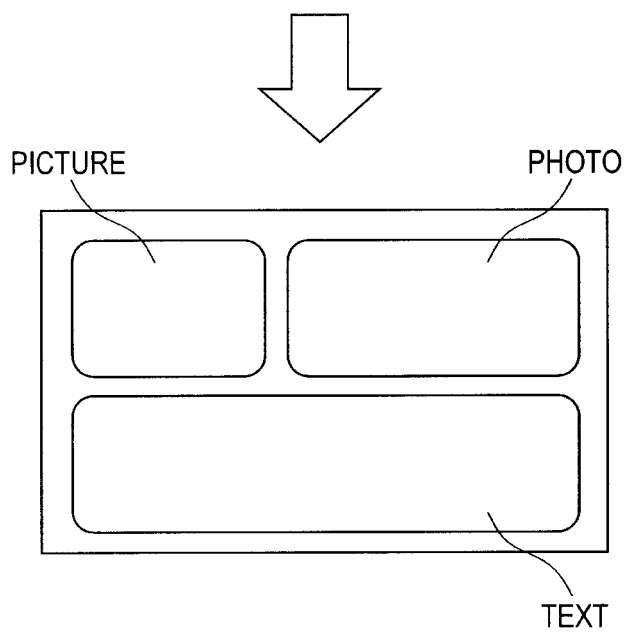

Subsequently, the document image analyzing process in the step S3000 of FIG. 4 will be described. In the document image analyzing process, the image analysis unit 202 recognizes meaningful blocks in the image as a lump, and judges the attribute for each block. For example, if the image analysis unit 202 performs the document image analyzing process to the document image illustrated in FIG. 5A, then the document image is divided into blocks such as a text block, a picture block and a photo block as illustrated in FIG. 5B. In the present embodiment, the existing document image analyzing process is used. Hereinafter, an example of the document image analyzing process will be briefly described.

That is, in the document image analyzing process, the image analysis unit 202 first performs a binarizing process to the input image, thereby obtaining black and white images. Then, the image analysis unit 202 performs contour line tracking and thus extracts a lump of the pixels surrounded by a black pixel contour. If the black pixels have a certain square measure or more, the image analysis unit 202 performs the contour line tracking to white pixels in the input image and thus extracts a lump of the white pixels. If the lump of the white pixels has a certain square measure or more, the image analysis unit 202 further extracts a lump of the black pixels. Then, if the extracted lump has a certain square measure or more, the image analysis unit 202 recursively performs the extraction process.

The image analysis unit 202 classifies the lump of the black pixels obtained in the above process, into the blocks respectively having various attributes according to the sizes and the shapes thereof. For example, the image analysis unit 202 sets the block of which the aspect ratio is close to "1" to the lump of the pixels corresponding to the characters. Further, if the adjacent lumps of the pixels corresponding to the characters are in line and thus can be grouped, the image analysis unit 202 sets these lumps to the character string block. Furthermore, if the amorphous lumps of the pixels are scattered, the image analysis unit 202 classifies these lumps into the photo block, and classifies other lumps into the picture block and the like.

In the document image analyzing process, the image analysis unit 202 stores the positional information, the attributes and the like of the classified blocks in a not-illustrated storage apparatus.

Figures 6, 7:
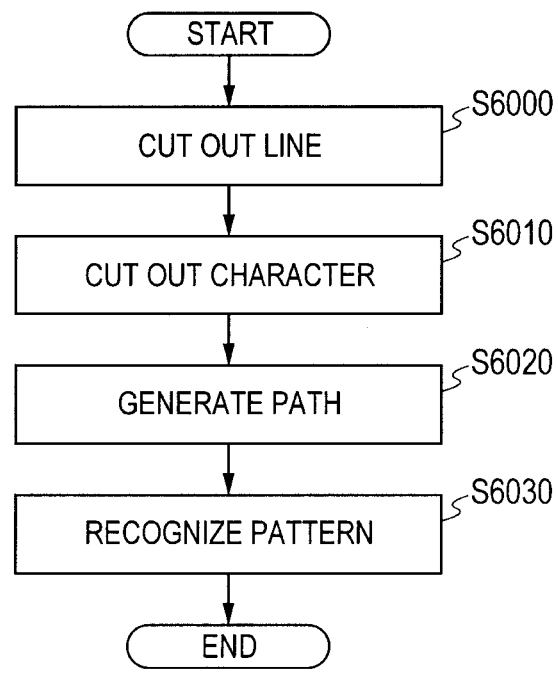
FIG. 6 is a diagram for describing an example of a result of the document image analyzing process.
FIG. 7 is a flow chart indicating an example of a character recognition process.

FIG. 6 is the diagram for describing an example of the document image analysis result. Here, the document image analysis result includes a data ID 501 for uniquely determining each component, a component attribute 502 for indicating the attributes of the component (1 . . . character string; 2 . . . picture (figure); 3 . . . photo), positional coordinates (X) 503 and (Y) 504 of the component, and a width (W) 505 and a height (H) 506 of the circumscribed rectangle of the component. Incidentally, the positional coordinates 503 and 504 of the component are the positional coordinates (X,Y) which are obtained based on the upper left of the document image set as the original point (0, 0). Each of the width (W) 505 and the height (H) 506 of the component is represented by the number of pixels.

Subsequently, the character recognition process in the step S3020 of FIG. 4 will be described. FIG. 7 is the flow chart indicating an example of the character recognition process.

In a step S6000, the character recognition unit 203 performs a line cutout process. In the line cutout process, the character recognition unit 203 specifies the area which is believed to be a line, by performing projection. Then, the specified area is cut out as the line.

In a step S6010, the character recognition unit 203 performs the character cutout process to the line obtained in the step S6000. As well as the line cutout process, in the character cutout process, the character recognition unit 203 specifies the area which is believed to be a character, by performing projection. For example, with respect to a horizontal writing, the area which is believed to be the character can be specified by performing the projection in the vertical direction.

In a step S6020, the character recognition unit 203 generates the path based on the combination pattern of the character regions obtained in the step S6010. As described above, the path indicates the pattern of the character cut out from the certain character string. Since it is generally conceived that the plural patterns of the characters are cut out, the plural paths are resultingly generated.

In a step S6030, the character recognition unit 203 performs pattern recognition to each character area in the path generated in the step S6020. As a result of the pattern recognition, plural recognition (result) candidates are generated for each character area, and scores respectively indicating similarity are calculated. Then, the respective recognition candidates are sorted in score descending order, and the character having the highest score is set as a first candidate character. Then, the character having the second highest score is set as a second candidate character, and then the character having the n-th highest score is set as an n-th candidate character.

FIG. 8 is the diagram for describing an example of a result of the character recognition process (i.e., a character recognition process result). Here, the character recognition process result includes a data ID 701 for uniquely determining each path, and candidate characters 702, 703 and 704 respectively indicating candidates of the recognized characters in the path. Further, each character area in the path is recognized as plural candidate characters by the pattern recognition, and the score is given to each character. For example, the path of which the path ID is "1" includes the eight character areas, and the first candidate characters of the respective character areas are "丿", "1", "\", "l", "I", "l", "さ" and "ん".

Figure 9:
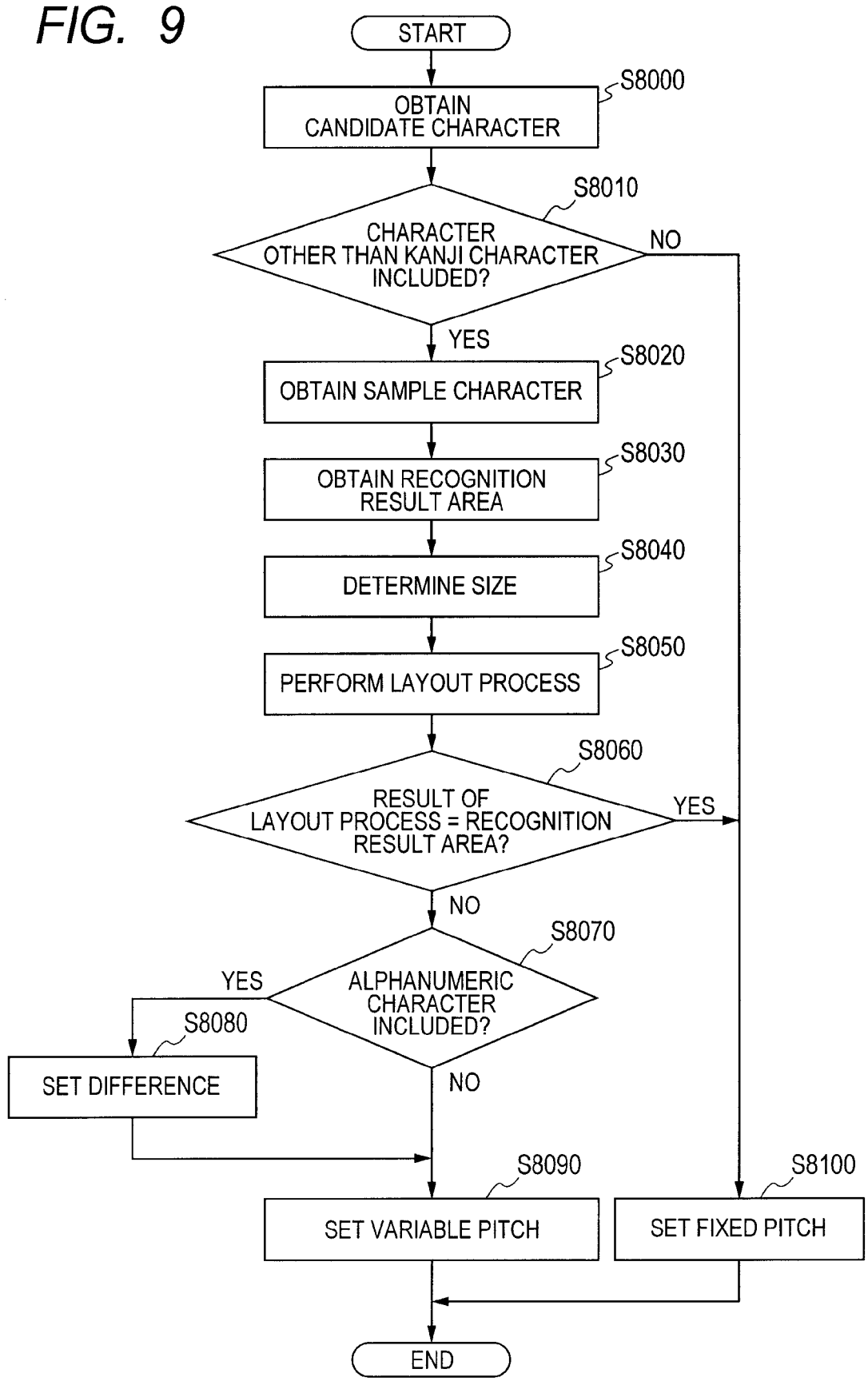
FIG. 9 is a flow chart indicating an example of a layout information generation process.

Subsequently, the layout information generation process in the step S3030 of FIG. 4 will be described. FIG. 9 is the flow chart indicating an example of the layout information generation process.

In a step S8000, the layout information generation unit 204 obtains the first candidate of the recognition result for the recognition-target character string. Here, the recognition-target character string is equivalent to the overall character string extracted by the document image analyzing process.

In a step S8010, the layout information generation unit 204 judges whether or not a character other than the kanji character is included in the first candidate character string of the recognition result obtained in the step S8000. Here, the layout information generation unit 204 performs this judgment by checking the character code. Then, if judged that the character other than the kanji character is included in the first candidate character string of the recognition result, the layout information generation unit 204 advances the process to a step S8020. On the other hand, if judged that the character other than the kanji character is not included in the first candidate character string of the recognition result, the layout information generation unit 204 advances the process to a step S8100.

In the step S8020, the layout information generation unit 204 obtains the character string other than the kanji character from the character strings obtained in the step S8000. Here, if the obtained character string includes the plural characters other than the kanji character, the layout information generation unit 204 sets the continuous characters to one group. Here, if the plural groups exist, the layout information generation unit 204 obtains an average value of the scores of the candidate characters for each group, and then obtains the group having the highest average value. For example, if there is a character string "朝礼を利用した職場でのコミュニケーション", groups of "を", "した" and "でのコミュニケーション" are generated. Consequently, the layout information generation unit 204 obtains the average value of the scores for each of these groups, and then obtains the group having the highest average value.

In a step S8030, the layout information generation unit 204 obtains a recognition result area of the character string obtained in the step S8020. Here, the recognition result area indicates the circumscribed rectangle of the character string.

In a step S8040, the layout information generation unit 204 determines the font size of the character string included in the area obtained in the step S8030. In this case, the layout information generation unit 204 draws the head character of the character string by using predetermined font and size. The layout information generation unit 204 compares the size of the drawn result with the size of the character in the image (i.e., the head character in the area obtained in the step S8030). Then, if the size of the drawn result is larger than the size of the character in the image, the layout information generation unit 204 reduces the font size and again compares the size of the drawn result with the size of the character in the image. On the other hand, if the size of the drawn result is smaller than the size of the character in the image, the layout information generation unit 204 enlarges the font size and again compares the size of the drawn result with the size of the character in the image. Thus, the layout information generation unit 204 determines the font size by properly adjusting it based on the comparison results.

In a step S8050, the layout information generation unit 204 performs the layout process by using the font size determined in the step S8040 and a predetermined fixed pitch font. Here, the layout process is performed in regard to the character string obtained in the step S8020.

In a step S8060, the layout information generation unit 204 compares the result area of the layout process in the step S8050 with the recognition result area obtained in the step S8030. In this case, the layout information generation unit 204 first compares the lengths of the widths of these areas with each other, and judges whether or not a difference between these lengths is larger than a predetermined threshold. If judged that the difference is larger than the predetermined threshold, the layout information generation unit 204 judges that the layout result is not equivalent to the recognition result, and advances the process to a step S8070. On the other hand, if judged that the difference between the lengths of the widths of these areas is smaller than the predetermined threshold, the layout information generation unit 204 judges that the layout result is equivalent to the recognition result, and advances the process to the step S8100.

In the step S8070, the layout information generation unit 204 judges whether or not an alphanumeric character is included in the character string obtained in the step S8020. In this case, the layout information generation unit 204 performs such judgment by checking the character code. Then, if judged that the alphanumeric character is included in the character string, the layout information generation unit 204 advances the process to a step S8080. On the other hand, if judged that the alphanumeric character is not included in the character string, the layout information generation unit 204 advances the process to a step S8090.

In the step S8080, the layout information generation unit 204 holds the difference between the lengths of the widths of the areas calculated in the comparison process in the step S8060, as a size difference for the font.

In the step S8090, the layout information generation unit 204 selects a variable-pitch font as the layout information, and then ends the process. Here, if the size difference is held in the step S8080, the layout information generation unit 204 holds information concerning the size difference together with the font information.

In the step S8100, the layout information generation unit 204 selects a fixed pitch font as the layout information, and then ends the process.

As just described, it is possible by the above-described method to calculate the layout information in the recognition-target character string. In a case where the character string includes only kanji characters, there is a characteristic that the layout result does not change even if any font is used. In other words, if the kanji character is used, the area size of the layout result is the same even if the fixed pitch font is used or the variable pitch font is used. On the other hand, in a case where the character string includes a character (hiragana character, katakana character, alphanumeric character) other than the kanji character, the area size of the layout result differs according to the font. However, if the hiragana character or the katakana character is used, the area size of the layout result is the same even if what kind of fixed pitch font is used. In the present embodiment, the font is determined by using such properties as described above. To determine the font, the existing font recognition process can be used. However, it is possible to reduce a processing load by using the method described in the present embodiment.

Further, in the present embodiment, the layout information generation process is performed to the overall character strings included in the area obtained by the document image analyzing process. However, the present invention is not limited to this. For example, it is possible to perform the layout information generation process for each line or each word.

Figures 10, 11:
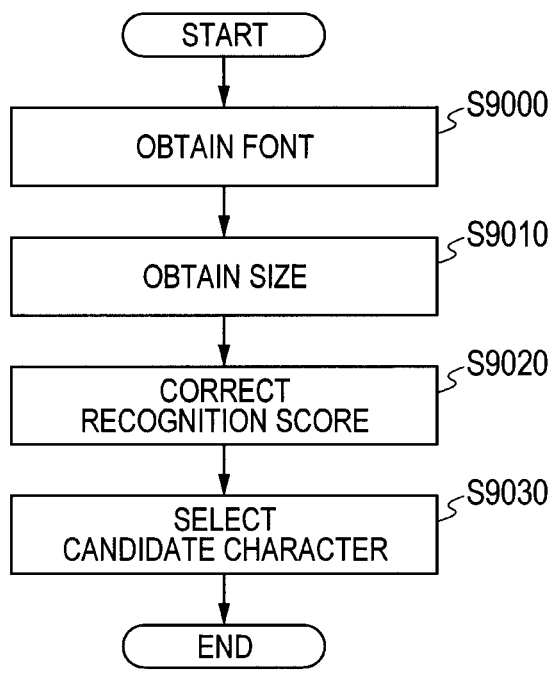
FIG. 10 is a flow chart indicating an example of a candidate character selection process.
FIG. 11 is a diagram for describing an example of a result of score correction.

Subsequently, the candidate character selection process in the step S3050 of FIG. 4 will be described. FIG. 10 is the flow chart indicating an example of the candidate character selection process.

In a step S9000, the layout unit 205 obtains the font information in the selected path. Here, it should be noted that the font information has been obtained in the step S3030 of FIG. 4.

In a step S9010, the layout unit 205 obtains the font size information in the selected path. Here, it should be noted that, as well as the font information, the font size information has been obtained in the step S3030 of FIG. 4.

In a step S9020, the layout unit 205 corrects the recognition score by using the font information and the font size information respectively obtained in the steps S9000 and S9010. In such a correction process, the layout unit 205 performs a drawing process to each character in the path by using the obtained font. Then, the layout unit 205 obtains a coefficient based on the font size by comparing a drawing process result with the image data of the character being the target of the drawing process. The layout unit 205 calculates the correction score by multiplying the obtained coefficient and the score already calculated by the recognition process together. More specifically, the layout unit 205 calculates the correction score by using the following expression:

correction score={|character image width−drawing result width|/character image width}×{|character image height−drawing result height|/character image height}×100

FIG. 11 is the diagram for describing an example of the result of the score correction. This diagram includes a character code 1001 indicating the recognition result character, a recognition score 1002, and a coefficient 1003 based on the font size. Here, it is assumed that the larger the numerical value of the score is, the more excellent the result is. Further, a correction score 1004 is obtained by multiplying the recognition score and the coefficient based on the font size together. For example, in a case where a correct character is "禾", the layout unit 205 calculates the coefficient based on the font size by comparing the image data "禾", with the drawing result of the character code (recognition result character) 1001.

In a step S9030, the layout unit 205 selects the candidate character based on the result of the correction score obtained in the step S9020. More specifically, the layout unit 205 selects, as the candidate character, the character which has the highest correction score. In the example illustrated in FIG. 11, since the character code "丿" has the highest correction score "341360", this character is selected as the candidate character.

It is possible, by performing the above-described process to all the characters in the path, to select the candidate character in the path.

Figure 12:
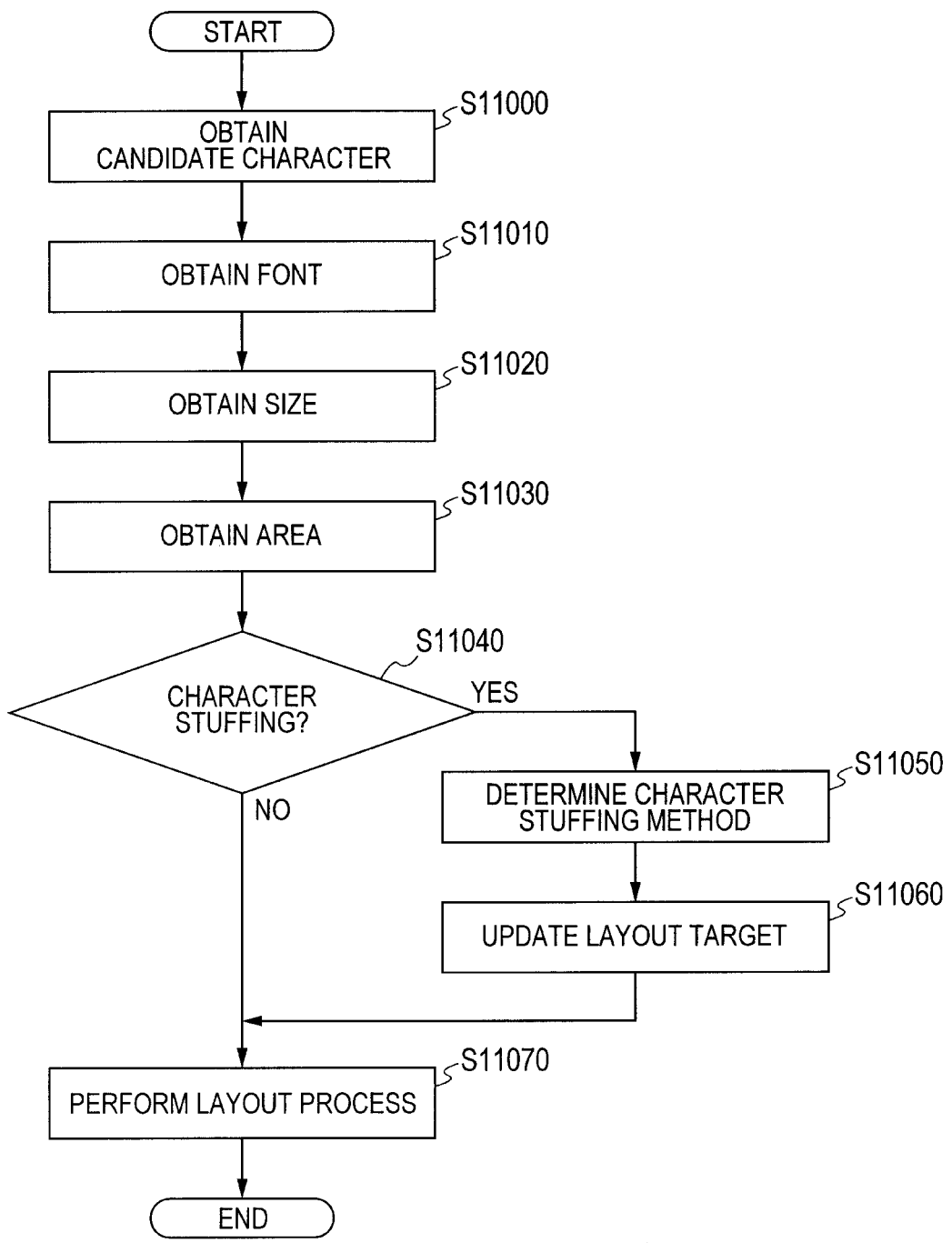
FIG. 12 is a flow chart indicating an example of a layout process.

Subsequently, the layout process in the step S3060 of FIG. 4 will be described. FIG. 12 is the flow chart indicating an example of the layout process.

In a step S11000, the layout unit 205 obtains the candidate character string which is the layout target. Here, the candidate character string is the character string obtained in the step S3050 of FIG. 4.

In a step S11010, the layout unit 205 obtains the font which is the layout target. Here, the relevant font information is the information obtained in the step S3030 of FIG. 4.

In a step S11020, the layout unit 205 obtains the font size which is the layout target. Here, as well as the font information, the relevant font size information is the information obtained in the step S3030 of FIG. 4.

In a step S11030, the layout unit 205 obtains the area in the image, which is the layout target. Here, the area is the circumscribed rectangle of the character string area cut out by the character recognition.

In a step S11040, the layout unit 205 judges whether or not there is a possibility that character stuffing occurs in the layout process. In such a judgment process, the layout unit 205 first obtains the recognition result for the subsequent line of the line corresponding to the character string of the layout target, and then performs the judgment based on the obtained recognition result. More specifically, the layout unit 205 uses a kind of character at the head of the subsequent line. Then, the layout unit 205 checks if the recognition result indicates an alphanumeric character. Then, if the recognition result indicates the alphanumeric character, the layout unit 205 judges that there is the possibility that the character stuffing occurs. On the other hand, if the recognition result does not indicate the alphanumeric character, the layout unit 205 further checks if the second character on the subsequent line is a prohibited character around line boundary. Then, if the second character on the subsequent line is the prohibited character around line boundary, the layout unit 205 judges that there is the possibility that the character stuffing occurs in the layout process, as well as the case of the alphanumeric character. If judged that there is the possibility that the character stuffing occurs in the layout process, the layout unit 205 advances the process to a step S11050. On the other hand, if judged that there is no possibility that the character stuffing occurs, the layout unit 205 advances the process to a step S11070.

In the step S11050, the layout unit 205 determines a character stuffing method. In such a process of determining the character stuffing method, the layout unit 205 first calculates the average number of characters for each line in the character string of the area obtained in the step S3010 of FIG. 4. Then, the layout unit 205 compares the number of characters of the layout-target character string with the calculated average number of characters. Here, if the number of characters of the layout-target character string is larger than the calculated average number of characters, the layout unit 205 judges that a so-called running-on process has been performed. On the other hand, if the number of characters of the layout-target character string is smaller than the calculated average number of characters, the layout unit 205 judges that a so-called running-out process has been performed. Here, the running-on process is a part of the character layout process which is performed to prevent that a word is involuntarily divided into two on successive two lines, and the running-out process is also a parts of the character layout process which is performed to prevent that a punctuation mark is disposed at the head of a line. In any case, since there is a case where spacing of characters or words is dynamically changed according to a kind of process, it is necessary to discriminate what kind of process has been performed. The layout unit 205 determines the character stuffing method according to the discriminated kind of process.

In a step S11060, the layout unit 205 updates the target of layout. More specifically, the layout unit 205 performs the character stuffing according to the determined character stuffing method, and adds, to the target of layout, the character string of the subsequent line which acts on the character stuffing to the previous line.

In the step S11070, the layout unit 205 performs the layout process to the layout-target character string. Here, the layout unit 205 performs the layout process by using the existing character layout technique.

Figure 13:
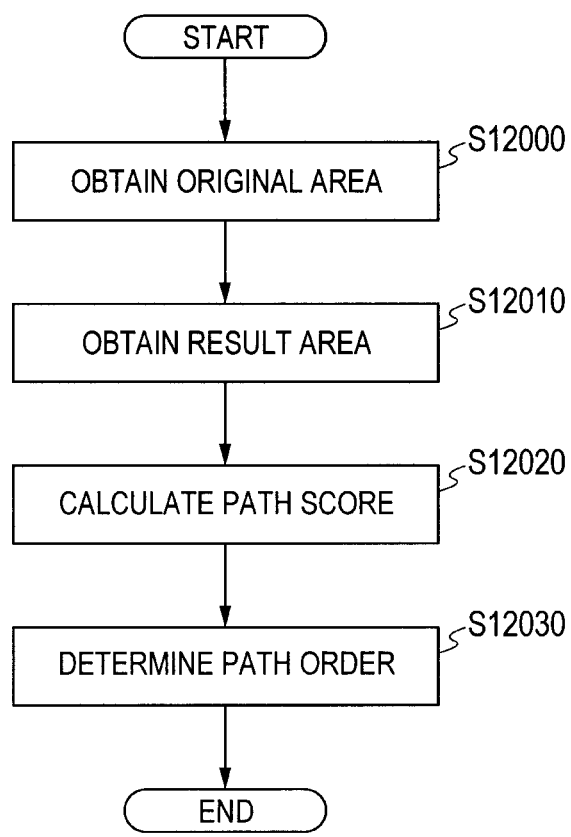
FIG. 13 is a flow chart indicating an example of an evaluation process.

Subsequently, the evaluation process in the step S3070 of FIG. 4 will be described. FIG. 13 is the flow chart indicating an example of the evaluation process.

In a step S12000, the character recognition correction unit 206 obtains the circumscribed rectangle of the image in the recognition-target character string.

In a step S12010, the character recognition correction unit 206 obtains the circumscribed rectangle of the layout result.

In a step S12020, the character recognition correction unit 206 calculates a path score. In such a path score calculation process, the character recognition correction unit 206 actually calculates the path score by using the widths of the circumscribed rectangles respectively obtained in the steps S12000 and S12010. More specifically, the character recognition correction unit 206 calculates the path score by using the following expression:

$$\text{path score} = \{\Sigma(\text{score of each character}) \times |\text{character string image width} - \text{layout result width}|/\text{character string image width}\}/\text{the number of characters}$$

In a step S12030, the character recognition correction unit 206 determines path order.

Figure 14:
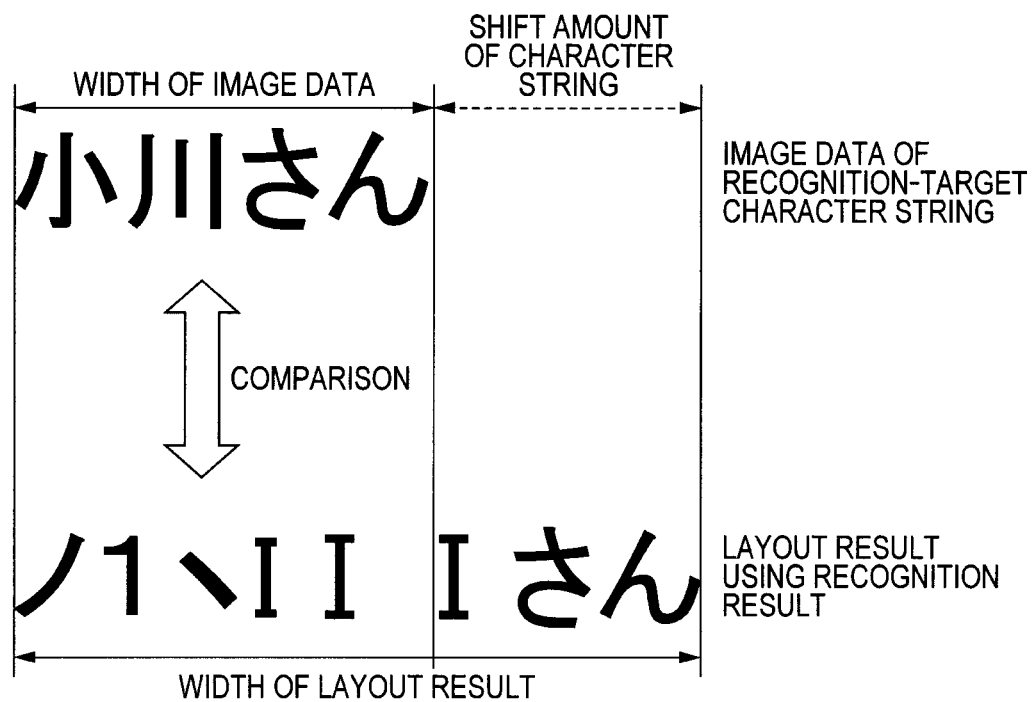
FIG. 14 is a conceptual diagram for describing path score calculation.

FIG. 14 is the conceptual diagram for describing the path score calculation. That is, the character recognition correction unit 206 compares the layout state of the recognition-target image with the layout result obtained by using the recognition result to obtain a difference, and represents the obtained difference by means of the score. More specifically, if the difference is small, it is judged that a possibility that the recognition is correctly performed is high, whereby higher score is given.

As just described, according to the process in the present embodiment, it is possible based on the evaluation result to correct the result of the character recognition. In the related background art, the score of each character becomes high occasionally even for an erroneous path. However, it is possible in the present embodiment to solve such a problem.

In the embodiment 1, the example that the result laid out by using the layout information generated from the document image is applied to the character recognition process is described in detail. Then, in an embodiment 2, a process of analyzing the scanned document image and converting it to have an electronic format capable of being edited by word processor software.

Figure 15:
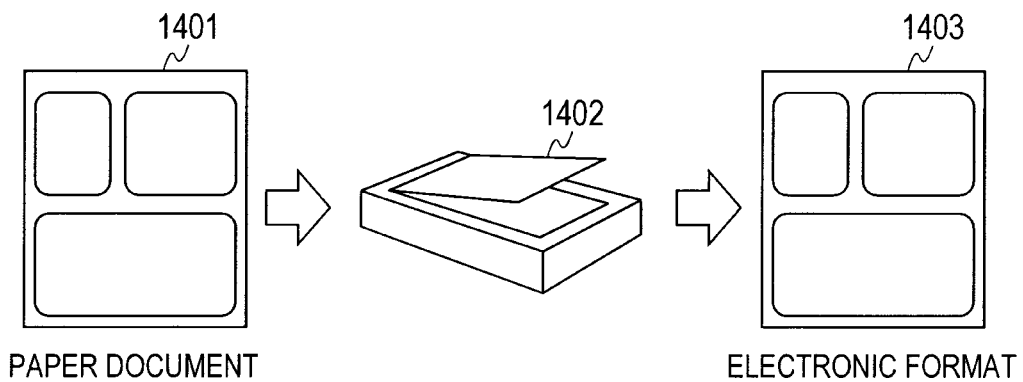
FIG. 15 is a conceptual diagram for describing an operation in the recognition process.

FIG. 15 is a conceptual diagram for describing an operation in the recognition process. That is, a paper document 1401 is input and then analyzed by a scanner 1402. The analyzed document is converted into a document 1403 having an editable electronic format. The converted document has the same layout as that of the input paper document. That is, since the layout is maintained, the design of the paper document can be maintained. Thus, it is possible to improve legibility and reusability. Further, a character string in the document image is cut out as an image for each character, and a layout process is performed to each cut-out image (i.e., each character image). Namely, since the layout process is performed for each character image, erroneous recognition in the character recognition process does not act on the layout process. For this reason, the layout process is performed to the character image by using the result obtained by extracting the layout information, the layout same as that of the paper document can be achieved. Further, since the layout is performed for each character image, if an editing operation such as deleting or the like is performed to a part of a character image string, a re-layout process can be performed according to the operation such as deletion or the like. For example, if a certain character image is deleted, the character image string is again laid out so as to stuff the deleted area.

FIG. 16 is a flow chart indicating an example of such an electronic format conversion process. Incidentally, in the following description, it is assumed for easy explanation that the CPU 11 performs the electronic format conversion process.

Here, it should be noted that processes in steps S15000, S15010, S15020 and S15030 are the same as those in the steps S3000, S3010, S3020 and S3030 of FIG. 4 respectively, whereby the description of these processes will be omitted here.

In a step S15040, the CPU 11 cuts out an image for each character area obtained in character cutting in the recognition process, and performs layout to the cut-out image. In such a layout process, the CPU 11 uses a font size obtained in a layout information obtaining process. Although the layout information obtaining process is the same as that in the embodiment 1 as described above, font information is unnecessary in the present embodiment because the layout is performed to the image. In a character recognition process, there is a possibility that a character cannot correctly be recognized. Therefore, if the layout is performed to a character string in which erroneous recognition has occurred, a character width and the number of characters are changed as compared with a character string of the paper document, whereby the layout same as that of the input paper document cannot be generated. On the other hand, as described above, if the character data of the paper document is cut out as the image and the cut-out image data is disposed, it is possible to have an effect that erroneous recognition does not act on.

In a step S15050, the CPU 11 generates the editable electronic format on the basis of the layout result obtained in the step S15040.

As described above, since the layout information is first obtained from the document image data and then the obtained layout information is used, it is possible to convert the paper document into the document data having the editable electronic format.

In the above-described embodiments, the kanji character is exemplarily used. However, also in a case where alphabetical characters are used, in particular, if a proportional font is used in the character string, there is a case where an erroneous pause or discontinuity of characters is generated. For example, the erroneous pause or discontinuity is generated between "rn" and "m", "cl" and "d", or the like. Consequently, the present invention can be likewise applied.

According to the above-described embodiments, the process in which the layout information is used can be performed to the documents of various layouts.

The exemplary embodiments of the present invention have been described as above. However, as many apparently widely different and modified embodiments of the present invention can be made without departing from the spirit and scope thereof, it is to be understood that the present invention is not limited to the above-described specific embodiments thereof expect as defined in the appended claims.

For example, in the above-described embodiments, since the horizontally written character string is described, the row information (i.e., horizontal line information) is used. However, if a vertically written character string (string image) is treated, the character recognition processing apparatus uses column information (i.e., vertical line information). Moreover, in the above-described embodiments, since the horizontally written character string is treated, the width of the image data of the recognition-target character string is compared with the width of the layout result obtained by using the recognition result, as illustrated in FIG. 14. However, if the vertically written character string is treated, the character recognition processing apparatus may compare the height of the height of the image data of the recognition-target character string with the height of the layout result obtained by using the recognition result.

Various exemplary embodiments, features, and aspects of the present invention will now be herein described in detail below with reference to the drawings. It is to be noted that the relative arrangement of the components, the numerical expressions, and numerical values set forth in these embodiments are not intended to limit the scope of the present invention.

Aspects of the present invention can also be realized by a computer of a system or an apparatus (or a device such as a CPU or an MPU) that reads out and executes a program recorded on a memory device to perform the functions of the above-described embodiments, and by a method, the steps of which are performed by a computer of a system or an apparatus by, for example, reading out and executing a program recorded on a memory device to perform the functions of the above-described embodiments. For this purpose, the program is provided to the computer for example via a network or from a recording medium of various types serving as the memory device (e.g., a computer-readable medium).

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-244728, filed Oct. 23, 2009, which is hereby incorporated by reference herein in its entirety.

What is claimed is:

1. An image processing apparatus comprising:
   a character recognition unit adapted to perform a character recognition process on an area indicating a character string included in image data to obtain a plurality of candidates for the character string;
   a layout information generation unit adapted to generate layout information for layout of the character string on the basis of the area;
   a layout unit adapted to perform layout of each of the plurality of candidates obtained by the character recognition unit, on the basis of the layout information generated by the layout information generation unit;
   a comparison unit adapted to compare an image of the area indicating the character string with a layout result obtained by performing the layout of the result of each of the plurality of candidates; and
   a selection unit adapted to select one of the plurality of candidates on the basis of a result of the comparison by said comparison unit.

2. An image processing apparatus according to claim 1, wherein the character recognition unit outputs a plurality of candidates for the character string, and the correction unit corrects the result of the character recognition process by adjusting scores of respective candidates.

3. An image processing apparatus according to claim 2, wherein the correction unit adjusts the scores of respective candidates on the basis of a difference between sizes of the image of the area indicating the character string and the layout result obtained by performing the layout of the result of the character recognition process.

4. An image processing method to be performed by an image processing apparatus, the image processing method comprising:
   performing a character recognition process on an area indicating a character string included in image data to obtain a plurality of candidates for the character string;
   generating layout information for layout of the character string on the basis of the area;
   performing layout of each of the plurality of obtained candidates, on the basis of the generated layout information;
   comparing an image of the area indicating the character string with a layout result obtained by performing the layout of each of the plurality of obtained candidates; and
   selecting one of the plurality obtained candidates on the basis of a result of the comparison from said comparison step.

5. A non-transitory storage medium which stores a program for causing a computer to function as:
   a character recognition unit adapted to perform a character recognition process on an area indicating a character string included in image data to obtain a plurality of candidates for the character string;
   a layout information generation unit adapted to generate layout information for layout of the character string on the basis of the area;
   a layout unit adapted to perform layout of each of the plurality of candidates obtained by the character recognition unit, on the basis of the layout information generated by the layout information generation unit;

a comparison unit adapted to compare an image of the area indicating the character string with a layout result obtained by performing the layout of each of the plurality of candidates; and a selection unit adapted to select one of the plurality of candidates on the basis of a result of the comparison by said comparison unit.

6. An image processing apparatus comprising:

a character recognition unit adapted to perform a character recognition process on an area indicating a character string included in image data;

a layout information generation unit adapted to generate layout information for layout of the character string on the basis of the area; and a layout unit adapted to perform layout of a result of the character recognition process by the character recognition unit, on the basis of the layout information generated by the layout information generation unit, wherein in case of performing the layout of the result of the character recognition process, the layout unit judges whether or not there is a possibility that character stuffing occurs, on the basis of a result of the character recognition process by the character recognition unit for a character string of a next line following the character string of the area corresponding to the result of the character recognition process being a layout target, and wherein in a case where it is judged that there is the possibility that the character stuffing occurs, the layout unit performs the layout of the result of the character recognition process after adding the character string of the next line to the layout target.

7. An image processing method to be performed by an image processing apparatus, the image processing method comprising:

performing a character recognition process on an area indicating a character string included in image data;

generating layout information for layout of the character string on the basis of the area; and performing layout of a result of the performed character recognition process, on the basis of the generated layout information, wherein in case of performing the layout of the result of the character recognition process, it is judged whether or not there is a possibility that character stuffing occurs, on the basis of a result of the performed character recognition process for a character string of a next line following the character string of the area corresponding to the result of the character recognition process being a layout target, and wherein in a case where it is judged that there is the possibility that the character stuffing occurs, the layout of the result of the character recognition process is performed after adding the character string of the next line to the layout target.

8. A non-transitory storage medium which stores a program for causing a computer to function as:

a character recognition unit adapted to perform a character recognition process on an area indicating a character string included in image data;

a layout information generation unit adapted to generate layout information for layout of the character string on the basis of the area; and a layout unit adapted to perform layout of a result of the character recognition process by the character recognition unit, on the basis of the layout information generated by the layout information generation unit, wherein in case of performing the layout of the result of the character recognition process, the layout unit judges whether or not there is a possibility that character stuffing occurs, on the basis of a result of the character recognition process by the character recognition unit for a character string of a next line following the character string of the area corresponding to the result of the character recognition process being a layout target, and wherein in a case where it is judged that there is the possibility that the character stuffing occurs, the layout unit performs the layout of the result of the character recognition process after adding the character string of the next line to the layout target.

* * * * *